March 10, 1953　　　　　J. PHILLIPS　　　　　2,630,917
AGITATOR FOR GRAIN CLEANERS
Filed Aug. 31, 1948　　　　　　　　　　　2 SHEETS—SHEET 1
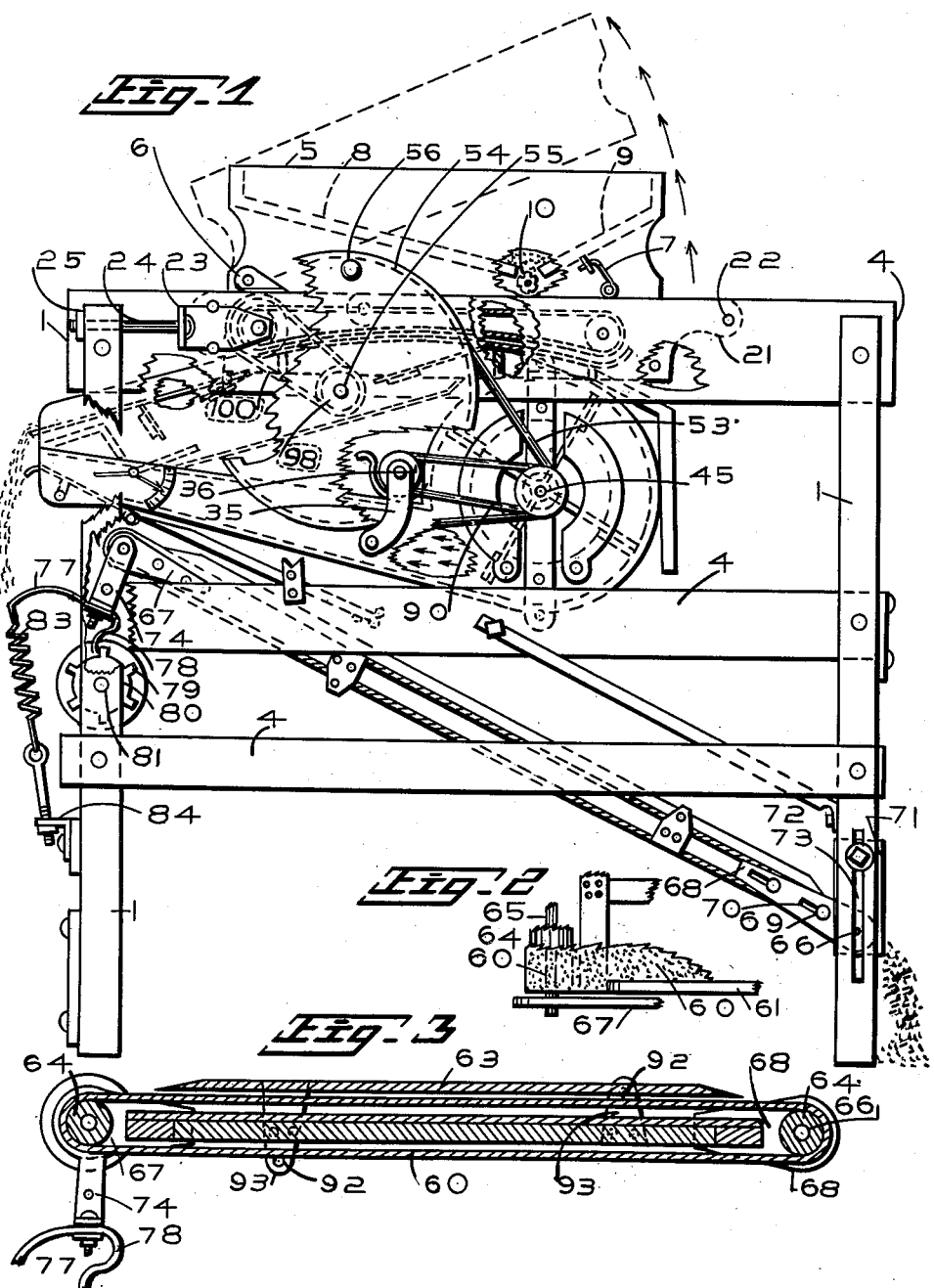

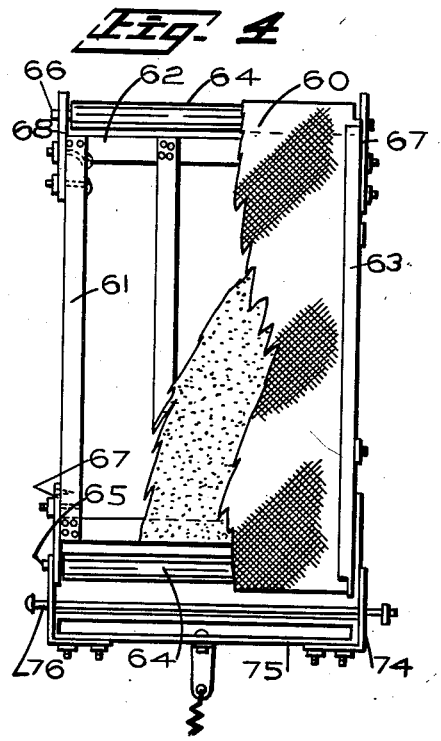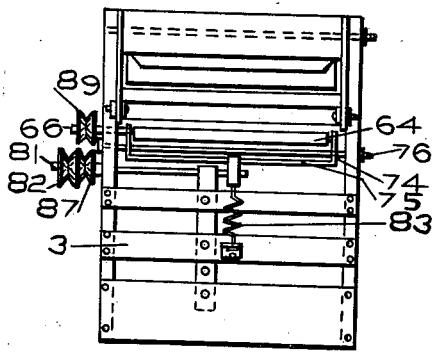

Patented Mar. 10, 1953

2,630,917

UNITED STATES PATENT OFFICE 2,630,917

AGITATOR FOR GRAIN CLEANERS

John Phillips, Mundare, Alberta, Canada

Application August 31, 1948, Serial No. 47,063

1 Claim. (Cl. 209—78)

My invention relates to machines for cleaning grain, having reference to a machine capable of cleaning different kinds of grains such as wheat, barley and rye, or other grains.

In the art to which the invention relates various means have been proposed for cleaning grain by the use of screens and cloth shakers by which foreign matter such as chaff, ragweed, wild oats and various other weed seeds may be separated from the grain. The present invention contemplates improvements in machines of this character by which not only is the grain freed from this matter, but in the same operation the dirt and foul weed seeds such as stinkweed and mustard, are separated from the dockage which can then be used as feed.

One of the objects of the invention is accordingly to provide an improved grain cleaner capable of separating weed seeds and other foreign matter from the grain, and further adapted to separate the dockage to eliminate matter not suitable as feed.

A further object of the invention is to provide in a grain cleaner means by which the cleaner can be adjusted to handle various kinds of grain, and to deal effectively with the different weed seeds and the like to be found in the grain, also capable of adjustment according to how clean a grain is desired. The machine is further capable of operating by engine power or by hand.

Other features and advantages of the invention will become apparent by reference to the accompanying description taken in conjunction with the drawings wherein like characters of reference are used to indicate like parts throughout the several views, and wherein:

Fig. 1 is a side view of the cleaner shown with certain parts broken away.

Fig. 2 is a detail top view of a fragment of the shaker cloth and mounting.

Fig. 3 is a side edge view of the shaker cloth and mounting.

Fig. 4 is a top plan view of the shaker frame and cloth, shown partly broken away.

Fig. 5 shows an end view, and includes the driving connection for the shaker cloth.

Having reference to the drawings, a frame structure is provided, substantially rectangular in formation and including corner uprights 1, end bars as at 2 and 3, and side bars 4; there being upper, intermediate and lower side bars.

On top of the frame is attached a hopper 5 that is hinged at 6 to swing back and may be secured by a catch 7. Within the hopper is a fixed plate 8 and a hinge mounted plate 9 that are inclined to come together and feed the grain to be cleaned on to a roller 10 mounted transversely in the hopper. The grain may then be screened, etc., for elimination of weed seeds, straw, stones and the like, before discharge on to my improved cloth shaker.

This includes a cloth shaker 60 of eiderdown cloth adapted to separate wild oat seed from the grain by adhering to its surface before final discharge of the cleaned grain. This shaker is built on a rectangular frame formed of side bars 61 and end bars 62 with intermediate bars lengthwise of the frame, and includes a side bar 63 to hold grain on the shaker.

At each end of the frame is mounted a roller 64, the one on an idler shaft 65, and the other on a drive shaft 66. These shafts are mounted for rotation in bearing plates 67 for the shaft 65 and plates 68 for the shaft 66. The plates 67 are fixed on the frame side bars 60, bolted thereto. The frame attaches to the plates 68 by means of bolts 69 engaged in slots 70 in said plates and free to slide therein to permit endwise shifting of the frame relative to the plates to the extent permitted by the slots. For adjustment of the inclination of the frame there are provided plates 71 in which the shaft 66 is suspended the plates being mounted vertically slidable by means of bolts 72 in the rear uprights 1 of the machine, engaged in slots 73.

The forward end of the shaker is supported by means of angle arms 74 and a cross bar 75, the arms 74 having a rod 76 by which they are supported on the frame. On the bar 75 is a steel spring 77 one arm 78 of which terminates in the path of lugs 79 on a wheel 80 mounted on a shaft 81 and driven by a pulley 82. As the wheel 80 rotates it pushes against the spring arm 78 until the end of the arm passes over a lug 79 when it is engaged by the next succeeding lug on the wheel. This movement of arm 78 is opposed by a counterspring 83 connecting the other end of spring 77 to a bracket 84 on a frame end bar 3.

The shaft 81 is belt driven by its pulley wheel 82 from a pulley 86 on the main drive shaft 55. The shaft 81 further by means of a pulley 87 is connectable to drive the cloth shaker shaft 66, through a pulley 89 on said shaft.

For dislodgment of the wild oats from the shaker cloth a wire 92 is provided stretched transversely below the cloth on lugs 93.

While I have herein disclosed a preferred embodiment of my invention it is obvious that changes in the construction and arrangement of parts would be permissible and in so far as such changes come within the spirit and scope of the invention as defined in the appended claims they would be considered a part hereof.

Having thus particularly described and ascertained the nature of my invention, what I claim and wish to secure by Letters Patent is:

In a grain cleaner a shaker cloth conveyer unit including a frame, drive and idle shafts for the unit, means rotatably mounting the drive shaft in the grain cleaner, additional means mounting said conveyer frame for longitudinal shiftable movement relative to said drive shaft, means mounting the other end of the conveyer frame on the idle shaft with said shaft free to rotate therein, a bracket mounting the idle shaft, said bracket providing a pair of arms in which said shaft is rotatable and a cross bar connecting the arms, means mounting the arms of said bracket in the cleaner free to turn, a spring arm having one end fixed to the cross bar, said end terminating in a depending portion, a wheel providing a series of teeth adapted for successive engagement of the depending portion of said arm, a spring engaging the other end of said arm adapted to normally hold the arm successively engageable with said teeth, and means adjustably attaching the spring in the cleaner.

JOHN PHILLIPS.

REFERENCES CITED

The following references are of record in the file of this patent:

UNITED STATES PATENTS

| Number | Name | Date |
|---|---|---|
| 107,860 | Bowen | Oct. 4, 1870 |
| 384,058 | Miller | June 5, 1888 |
| 460,436 | Gray | Sept. 29, 1891 |
| 496,206 | Placide | Apr. 25, 1893 |
| 633,527 | Middlebrook | Sept. 19, 1899 |
| 661,802 | Hilleary | Nov. 13, 1900 |
| 987,460 | Heldman | Mar. 21, 1911 |
| 1,287,624 | Bot | Dec. 17, 1918 |
| 1,306,870 | Vaughn | June 17, 1919 |
| 1,323,877 | Lee et al. | Dec. 2, 1919 |
| 1,331,608 | Alges | Feb. 24, 1920 |
| 1,354,750 | Holton | Oct. 5, 1920 |
| 1,356,043 | Cowan | Oct. 19, 1920 |
| 1,401,039 | Busch | Dec. 20, 1921 |
| 1,404,363 | Grimsrud | Jan. 24, 1922 |
| 2,104,785 | Akeyson | Jan. 11, 1938 |
| 2,407,653 | Dempsey | Sept. 17, 1946 |
| 2,518,043 | Mathews | Aug. 8, 1950 |

FOREIGN PATENTS

| Number | Country | Date |
|---|---|---|
| 61,767 | Austria | Oct. 25, 1913 |